Oct. 22, 1940. Y. C. LE GUILLOU 2,219,074
BALL AND THE LIKE
Filed April 5, 1938

INVENTOR
Yves C. Le Guillou
BY
Sidney A. Orbe
ATTORNEY

Patented Oct. 22, 1940

2,219,074

UNITED STATES PATENT OFFICE 2,219,074

BALL AND THE LIKE

Yves C. Le Guillou, New York, N. Y.

Application April 5, 1938, Serial No. 200,168

12 Claims. (Cl. 273—58)

This invention relates to improvements in balls for amusement devices and parlor games and particularly relates to balls for playing table tennis and the like and to methods of making the same.

The principal object of my invention is to provide a ball susceptible to magnetic attraction.

Another object is to provide a light weight hollow ball susceptible to magnetic attraction.

A particular object is to provide a bounding ball including means adapted to be susceptible to magnetic attraction and whose bounding characteristics are not adversely affected by reason of said means.

A further object is to provide a table tennis ball including a metal susceptible to magnetic attraction.

Another object is to provide a hollow ball of Celluloid or other material non-susceptible magnetically and containing granular particles of iron susceptible to magnetic attraction.

A still further object is to provide novel methods of associating a ferrous metal with the ball casing in making balls susceptible to magnetic attraction.

Moreover it is an object of the invention to provide a ball including a magnetically susceptible substance which will be attracted to a magnetic ball retriever of the kind described and claimed in my copending application, Ser. No. 200,167 filed April 5, 1938.

These and other objects of the invention relating to the improved ball and the process of fabricating the same will in part be obvious and in part be pointed out in the subsequent detailed description and the claims, and the accompanying drawing which however must be considered as merely illustrating a preferred embodiment of my invention and in no way limiting the invention to the embodiment shown and described. It will also be understood that the novel features of my invention are applicable to numerous games and ball devices therefor, and their broad application is contemplated as are all modifications including features of construction, combination of elements and arrangement of parts.

Figure 1:
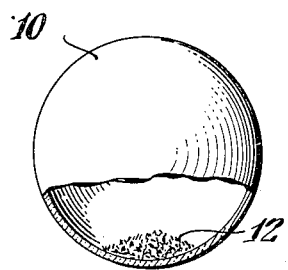
Fig. 1 is a view partially in section showing a hollow element containing a substance susceptible to magnetic attraction.

Referring to Figs. 1-4, of the drawing, Fig. 1 discloses my preferred ball construction, particularly adapted for indoor tennis, and comprising a spherical hollow body or shell 10 of light weight, substantially non-compressible in the use for which it is intended and adapted for bouncing against a hard surface. The wall of the shell is preferably thin, but may be of considerable thickness. Within the casing is a plurality of finely divided or powderlike particles 12 susceptible to magnetic attraction. These particles may be placed within the shell when bringing the halves of the ball together or may be admitted through a slight aperture in the shell to be subsequently sealed.

The body or shell may comprise a Celluloid composition, papier-mâché, treated fiber, or the like and may even be of wood. In fact, any material not itself susceptible to magnetic attraction and through which the lines of force of a magnet or magnetic field will be operable upon the magnetically susceptible substance within said body, may be used. Obviously the material will be selected bearing in mind the use to which the ball is to be adapted.

For example the usual table tennis ball is made of Celluloid and is about 1½ inches in diameter, and I have obtained very satisfactory results with such a ball containing about 5.25 grains (weight avoirdupois) of powdered iron of about 100 mesh. The ball readily responds to a magnetic pull of about 125 grains.

One of the advantages of the foregoing structure is that the rebounding characteristics of the ball, which is important in table tennis is substantially unaffected by the presence of the magnetically attractable material. Apparently the finely divided particles disperse when the ball strikes a surface and this neither affects its balance nor trueness of rebound.

The featured ball is particularly advantageous in table tennis, scoop ball and other parlor games where a ball may roll under furniture or other places accessible only with inconvenience, or where the playing board is quite long and the ball comes to rest at the net. In such cases it is merely necessary to employ the ball retriever of my copending application which includes a permanent or electro-magnet headpiece, and cause the magnetically susceptible particles within the ball to come within the influence of the magnetic field created by the ball retriever. Depending upon the strength of the field, the ball will either be drawn toward the retriever and held thereby or will be simultaneously held upon contact. In any case the magnetically susceptible particles will arrange themselves against the shell of the ball, forming the shortest magnetic circuit possible with the attracting field. In this manner the ball is held between the magnetized particles and retriever face and may be moved to any desired accessible place.

It will be understood, however, that the featured structure and broad concept is applicable to balls for other new and old amusement devices and games. For instance, in games where it is desired to retain a ball in a particular position after it rolls within a particular area of the playing surface. Also in games where a ball must be shot out in play the magnetic feature may be found useful in positioning the balls for hitting.

Figure 2:
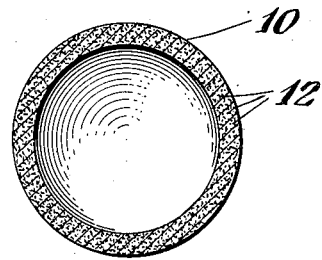
Fig. 2 is a view in section, of a hollow element having a substance susceptible to magnetic attraction forming a part of the body wall thereof.

While the foregoing ball structure is that preferred, other modifications within the spirit of my invention may be made and which in certain instances will be found satisfactory for the intended purposes. Thus, Fig. 2 shows a ball for instance of the character of that in Fig. 1 but differing in that the magnetically susceptible particles are incorporated in the wall of the shell particularly where of Celluloid or other thermoplastic or moldable material. In making this ball the magnetically susceptible particles may be included with the plastic or powdered materials and the ball then formed or the particles may be pressed into the shell under pressure and in the presence of heat during or after forming the sections of the ball which are then brought together in the usual manner. Preferably, the particles will be substantially uniformly distributed in order that the ball possess good balance. Obviously this ball will generally require magnetically susceptible particles throughout its structure in order to make it responsive to the magnetic field of the ball retriever or other magnetic device at any point. Accordingly it will utilize a greater total quantity of magnetically susceptible particles than the ball of Fig. 1 and will be less bounding and somewhat heavier, even if it is a thin wall structure. It will be understood that the wall thickness indicated in Fig. 2 is illustrative only and the ball may have a thin shell or a heavy one.

Figure 3:
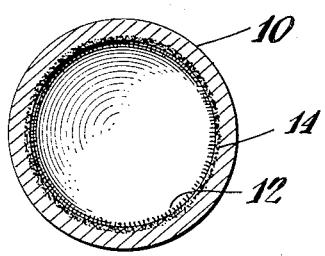
Fig. 3 is a sectional view of a further modification.

In Fig. 3 a further modification is shown. In this case the magnetically susceptible particles, preferably a powder, are bonded by a suitable adhesive 14 for instance, glue, cellulose cement, or a soluble silicate, to the inner surface of the ball. The cement may be applied by spraying the inner faces of the halves of the ball, and the particles of magnetically susceptible substance may then be dusted thereon before the cement has set. Subsequently the halves may be brought together. Obviously the particles may be secured to the exterior of the ball but such may adversely affect the appearance, bouncing and rolling characteristics of the ball and is therefore not as desirable.

Figure 4:
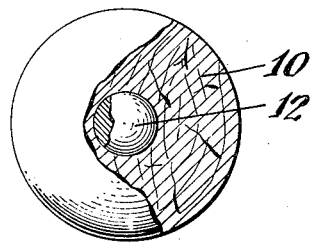
Fig. 4 is a view partially in section of a solid element having a core of a magnetic susceptible substance.

Fig. 4 illustrates a ball of substantially solid character for instance of wood, having a center of the magnetically susceptible particles.

It will be understood that the materials used for the structure of Fig. 1 may likewise be used for those of Figs. 2, 3 and 4 also that while not as satisfactory in the structure of Fig. 1 the particles 12 may be replaced in that construction and also in Fig. 4 by one or more solid pieces of any suitable shape. Moreover, in Fig. 4 the magnetically susceptible piece or pieces may be bonded to the inner cavity. Also while I have illustrated a ball of spherical shape it will be understood that the invention is applicable to other rolling shapes such as an egg or cylinder.

From a consideration of the foregoing description of the several embodiments of my invention it will be evident that I have made a new and novel ball useful for many games and devices. It will be understood by those skilled in the art that various changes and modifications may be made without departing from the spirit of my invention. I therefore desire to secure to myself all modifications and equivalent constructions and processes falling within the spirit and scope of the invention as expressed in the foregoing description, and I desire that the invention be construed to cover all equivalents and as broadly as the claims taken in conjunction with the prior art may allow.

I claim:

1. A rolling element for games and the like comprising a hollow relatively thin walled body of non-magnetic susceptibility and a plurality of fine particles within said body susceptible to magnetic attraction.

2. A rolling element for games and the like comprising a hollow body of non-magnetic susceptibility and a plurality of loose particles susceptible to magnetic attraction, within said body.

3. A rolling element for games and the like comprising a relatively thin walled hollow body of non-magnetic susceptibility and a plurality of individual particles susceptible to magnetic attraction substantially uniformly distributed and embedded in the body of said element.

4. A rolling element for games and the like comprising a relatively thin walled hollow body of non-magnetic susceptibility and a plurality of individual particles susceptible to magnetic attraction substantially uniformly distributed and bonded by an adhesive to the wall of said body.

5. A rolling element as claimed in claim 4 wherein the particles are bonded to the inner surface of said body.

6. A bounding ball comprising a shell of non-magnetic susceptibility adapted to rebound when striking a hard surface and a plurality of finely divided loose particles associated with said shell susceptible to magnetic attraction.

7. A bounding ball comprising a plurality of loose iron particles susceptible to magnetic attraction and a spherical shell adapted to rebound when striking a hard surface, said shell surrounding said particles, and comprising a material non-susceptible to magnetic attraction but not constituting a barrier to magnetic influences acting upon said iron particles from without.

8. A bounding ball adapted to rebound when striking a hard surface comprising a thin spherical shell of a material non-susceptible to magnetic attraction and a loose substance within said shell susceptible to magnetic attraction.

9. A bounding ball adapted to rebound when striking a hard surface comprising a thin, light weight shell of sheet-like material and a plurality of iron particles susceptible to magnetic attraction within said shell.

10. A bounding ball adapted to rebound when striking a hard surface comprising a light, thin walled shell of material selected from the group comprising Celluloid composition, papier-mâché, treated fiber, said shell containing a plurality of metal particles susceptible to magnetic attraction.

11. A table tennis ball comprising a thermoplastic composition shell and a plurality of fine iron particles loosely contained within said shell.

12. A table tennis ball comprising a thin Celluloid shell in the order of about one and one-half inches in diameter and about five and one-quarter grains by weight of powdered iron in the order of about one hundred mesh, loosely contained within said shell.

YVES C. LE GUILLOU.